US011795983B2

(12) United States Patent
Thomas

(10) Patent No.: US 11,795,983 B2
(45) Date of Patent: Oct. 24, 2023

(54) PULTRUDED TELESCOPING ARM DEVICE

(71) Applicant: Zephyros, Inc., Romeo, MI (US)

(72) Inventor: Joe Thomas, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 531 days.

(21) Appl. No.: 16/625,379

(22) PCT Filed: Jul. 2, 2018

(86) PCT No.: PCT/US2018/040569
§ 371 (c)(1),
(2) Date: Dec. 20, 2019

(87) PCT Pub. No.: WO2019/006449
PCT Pub. Date: Jan. 3, 2019

(65) Prior Publication Data
US 2021/0148391 A1     May 20, 2021

Related U.S. Application Data

(60) Provisional application No. 62/527,516, filed on Jun. 30, 2017.

(51) Int. Cl.
*F16B 7/10*     (2006.01)
*B29C 70/12*     (2006.01)
(Continued)

(52) U.S. Cl.
CPC .............. *F16B 7/10* (2013.01); *B29C 70/12* (2013.01); *B29C 70/523* (2013.01); *B62D 29/04* (2013.01);
(Continued)

(58) Field of Classification Search
CPC .... F16B 7/10; E04C 3/28; E04C 3/285; B60P 3/34; B62D 29/04; B62D 29/041; E04B 1/34305; E04B 1/343
See application file for complete search history.

(56) References Cited

U.S. PATENT DOCUMENTS

| 4,547,121 A | 10/1985 | Nesmith |
| 5,597,629 A * | 1/1997 | Johnson .................. E04H 12/02 428/36.1 |

(Continued)

FOREIGN PATENT DOCUMENTS

| EP | 1221383 A1 | 7/2002 |
| EP | 2548834 A1 | 1/2013 |

(Continued)

OTHER PUBLICATIONS

PCT Search Report dated Oct. 26, 2018, Application No. PCT/US2018/040569.

*Primary Examiner* — Adriana Figueroa
(74) *Attorney, Agent, or Firm* — The Dobrusin Law Firm, PC

(57) ABSTRACT

A support structure comprising a pultruded outer beam (12), a pultruded inner beam (14), a plurality of wear tabs (16) affixed to the inner beam, and a gear track (18) affixed to the inner beam. The outer beam is substantially hollow and adapted to receive the inner beam and the inner beam is shaped so that a portion of the inner beam extends nearly the entire height of the outer beam and a portion of the inner beam extends nearly the entire width of the outer beam, the plurality of wear tabs are located at one or more corners of the inner beam, and the gear track contacts a gear for facilitating movement of the inner beam.

11 Claims, 1 Drawing Sheet

(51) Int. Cl.
  B29C 70/52 (2006.01)
  B62D 29/04 (2006.01)
  B29K 75/00 (2006.01)
  B29K 309/08 (2006.01)
  B29L 31/00 (2006.01)
  B29L 31/30 (2006.01)
  E04C 3/28 (2006.01)
  B60P 3/34 (2006.01)
  E04B 1/343 (2006.01)

(52) U.S. Cl.
  CPC ...... B29K 2075/00 (2013.01); B29K 2309/08 (2013.01); B29L 2031/003 (2013.01); B29L 2031/30 (2013.01); B60P 3/34 (2013.01); E04B 1/34305 (2013.01); E04C 3/28 (2013.01)

(56) References Cited

U.S. PATENT DOCUMENTS

| | | | | |
|---|---|---|---|---|
| 5,605,017 | A * | 2/1997 | Fingerson | H02G 7/20 174/45 R |
| 5,984,396 | A * | 11/1999 | Schneider | B60P 3/34 296/26.14 |
| 6,293,611 | B1 * | 9/2001 | Schneider | B60P 3/34 296/26.14 |
| 6,688,680 | B1 * | 2/2004 | Cooper | B62D 29/004 296/70 |
| 6,976,721 | B2 * | 12/2005 | Rasmussen | B60P 3/34 296/26.14 |
| 7,150,483 | B2 * | 12/2006 | Rasmussen | B60P 3/34 296/26.14 |
| 7,828,329 | B2 * | 11/2010 | Biscan | B62D 21/20 280/789 |
| 8,235,421 | B2 * | 8/2012 | Biscan | E04B 1/34352 280/789 |
| 9,682,674 | B2 * | 6/2017 | Corwin | B60R 19/03 |
| 2011/0271623 | A1 * | 11/2011 | Kurath-Grollmann | B29C 70/446 52/309.1 |
| 2013/0312346 | A1 * | 11/2013 | To | E04C 3/28 52/837 |
| 2014/0159410 | A1 * | 6/2014 | Rasmussen | B60P 3/39 296/24.33 |
| 2016/0138267 | A1 * | 5/2016 | Ettinger | C08G 18/6662 521/110 |
| 2017/0328023 | A1 * | 11/2017 | Smith | E04H 12/2238 |

FOREIGN PATENT DOCUMENTS

| | | |
|---|---|---|
| WO | 2008/138094 A2 | 11/2008 |
| WO | 2012/156807 A1 | 11/2012 |

* cited by examiner

PULTRUDED TELESCOPING ARM DEVICE

TECHNICAL FIELD

The present invention pertains generally to telescoping support devices with particular utility for use with transportation vehicles and modular building structures.

BACKGROUND

Metallic parts are commonly used for support structures in transportation vehicles. However, such metallic parts are frequently exposed to the environment and thus subject to corrosion. This is particularly problematic with support parts that are designed to move relative to one another, as corrosion may prevent any movement (e.g., sliding) that may be required of the support device. Molded polymeric parts may be utilized for their lightweight nature and substantial strength. In addition, corrosion is also substantially avoided with molded parts. However, the cost for the tooling and molds adds significant cost to any part produced. Further, any significant change to the profile of a part requires new tooling for additional cost.

Pultrusion and extrusion processes permit the use of polymeric support parts but do not require the tooling and molds associated with molding. There is thus a desire to provide the strength of molded parts using parts formed by pultrusion or extrusion processes.

SUMMARY OF THE INVENTION

The teachings herein contemplate a support structure, comprising a pultruded outer beam, a pultruded inner beam. The outer beam may be substantially hollow and adapted to receive the inner beam and the inner beam may be shaped so that a portion of the inner beam extends nearly the entire height of the outer beam and a portion of the inner beam extends nearly the entire width of the outer beam. One or more of the outer beam and inner beam may comprise a polyurethane material. The support structure may comprise a plurality of fibers. The plurality of fibers may comprise glass fibers. One or more of the plurality of fibers may extend at least 50%, at least 60%, at least 75%, at least 80% or at least 90% of the length of the support structure. The plurality of fibers may be at less than about 50 mm in length. One or more of the plurality of fibers may extend along substantially the entirety of the support structure. One or more of the plurality of fibers may include a coating. The plurality of fibers may comprise at least about 15%, at least about 20% or at least about 30%, or at least about 40% of the support structure. The plurality of fibers may comprise less than about 70%, less than about 50%, or less than about 40% of the support structure. The support structure may have a wall thickness that is substantially constant along a length of each of the inner beam and outer beam.

The teachings herein further provide for a support structure comprising a pultruded outer beam, a pultruded inner beam, a plurality of wear tabs affixed to the inner beam, and a gear track affixed to the inner beam. The outer beam may be substantially hollow and adapted to receive the inner beam and the inner beam may be shaped so that a portion of the inner beam extends nearly the entire height of the outer beam and a portion of the inner beam extends nearly the entire width of the outer beam. The plurality of wear tabs may be located at one or more corners of the inner beam and the gear track may contact a gear for facilitating movement of the inner beam. The structure may be located as a support for a transportation vehicle. The inner beam may be adapted to initially be located within the outer beam and then slide out of the outer beam. The inner beam may support a portion of a recreational vehicle, allowing the portion to extend from a first position outward to a second position as the inner beam slides out of the outer beam. The inner beam may be formed as an I-beam. The outer beam may be substantially rectangular in shape having four walls. The I-beam may include two parallel wall structures and each wall structure includes at least one wear tab in between the wall structure and the outer beam. The !-beam may include two parallel wall structures and each wall structure includes at least two wear tabs in between the wall structure and the outer beam. Each of the parallel wall structures may include a curved surface at a terminating end of each wall. A molded sleeve may be bonded to the outer beam. A metallic component may be located within one or more of the pultruded inner beam or pultruded outer beam for imparting additional stiffness.

The support structure may include one or more additional members for connecting to at least one of the outer beam or inner beam. The support structure may include one or more additional members for connecting to at least two inner beams and at least two telescoping beam structures. Each telescoping beam structure may include exactly one inner beam and exactly one outer beam.

DETAILED DESCRIPTION

Figure 1:
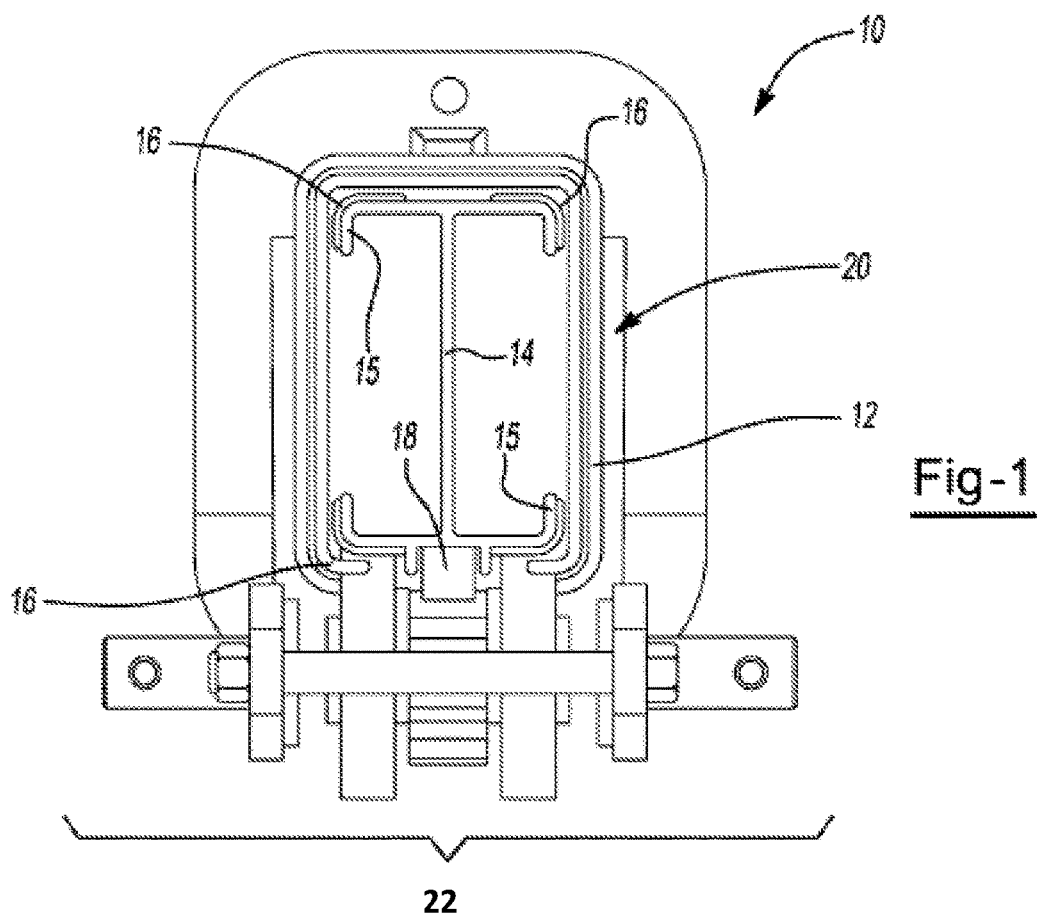
FIG. 1 illustrates a cross-sectional view of an exemplary support structure in accordance with the present teachings.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application is related to and claims the benefit of the filing date of U.S. Provisional Application Ser. No. 62/527,516, filed Jun. 30, 2017, the contents of that application being hereby incorporated by reference herein for all purposes.

The teachings herein are directed toward extruded and/or pultruded beam structures, especially for use with telescoping beam supports. The beam structures may be pultruded in hollow column profiles (e.g., tube-like profiles having empty space within the column), or they may be pultruded as solid structures. Such solid structures may be shaped so that they engage in a fitted relationship with an adjacent beam structure. Due to the telescoping nature of the beam structures, it is possible that a first (outer) beam structure may be pultruded as a hollow member. A second (inner) beam member may be pultruded as a solid member, which may be shaped to slide into and out of the first beam during use of the support structure. It is possible that the second beam member is shaped so that a portion of the inner beam slides along and in close contact with a surface of the outer beam.

The inner beam, the outer beam, or both may be fitted with structures (e.g., wear tabs or strips) to facilitate the sliding mechanism as the inner beam slides into and out of the outer beam. These wear tabs may be located on one or more surfaces of the inner beam, the outer beam, or both. It is possible that the tabs are co-extruded onto one or more surfaces of the inner or outer beam. In one embodiment, strips of wear tabs are located along one or more corners of the inner beam. It is possible that the inner beam may be formed with four curved corner structures, with each of the corner structures having a strip of wear tabs co-extruded thereon.

One or more of the inner beam and outer beam may be fitted with a means for facilitating connection of the beams to a gear/drive assembly. The gear drive assembly may provide the necessary power and movement to cause the inner beam to move into and/or out of the outer beam. The means may be one that directly contacts one or more of the inner beam or outer beam. The means may be a member that directly contacts and/or is adhered to or integrally formed with the inner beam. The means may include surfaces that contact a gear device, such that upon contact with the gear device, the means moves in a forward or backward direction, thereby moving the inner beam into and/or out of the outer beam.

The support structure may be formed with one or more telescoping beam devices. The telescoping beam devices may be in contact with a housing (e.g., a vehicle or modular building structure), whereby a portion of that housing is adapted to move during use. As a result, the telescoping beam devices may be located so that they cause movement of at least a portion of the housing. The support structure may include additional members that are connected to and/or work in concert with the telescoping beam devices to provide underlying support to a housing. The additional members may be connected to the telescoping beam device in a perpendicular or skew arrangement. The additional members may be arranged substantially parallel to the telescoping beam device. The additional members may also be pultruded or extruded. The additional members may be metallic members. The additional members may be arranged as a rectangular base with one or more telescoping beam devices extending crosswise in a parallel relationship with two additional members and a perpendicular relationship with two other additional members.

Typically, the inner and outer beams are either formed of metallic materials or formed of injection molded polymeric materials. The use of polymeric materials for reinforcement provides for lower weight reinforcing structures and also provides the ability to form members in a desired shape to fit the profile of a cavity requiring reinforcement. However, the injection molding process requires that a mold be created (at high cost) for each profile shape needed. Thus, any change to the shape of a cavity requires a new mold. Further, the nature of these polymeric reinforcement members are such that the formation of members with substantial length requires increasingly costly molds.

Accordingly, the ability to extrude and/or pultrude such polymeric reinforcements provides for a number of benefits. First, the use of extrusion/pultrusion techniques avoids the need for expensive molds and allows for simplified modification to the shape of the inner and outer beams. Second, the pultruded reinforcement members can be pultruded to form lengthy members having thinner walls with thinner profiles than their injection molded counterparts. The resulting parts are thus substantially lighter than a metallic beam or an injection molded polymeric beam.

In order to facilitate pultrusion of the members disclosed herein, the material for forming the members must have a melt strength that is sufficient for it to hold shape during the pultrusion process. Melt strength is the resistance of the polymeric material to stretching. The melt strength is related to the molecular chain entanglements of the polymer and its resistance to untangling under strain. The polymer properties affecting this resistance include molecular weight, molecular-weight distribution (MWD) and molecular branching. As each of these increases, melt strength is improved at low shear rates. For hollow profiles, the melt strength of the material will impact drawdown and sag. In co-extrusion applications, a relative balance of melt strength will improve stability at the interface between the beam and any additional material extruded thereon. Branched and crosslinked polymers require greater strain to untangle the molecules and permit them to flow, and thus provide more ideal melt strength.

The polymeric profiles may include fibers pultruded with the polymeric material and such fibers may preferably be lengthy (e.g., they may extend along at least $\frac{1}{4}^{th}$, at least $\frac{1}{2}$ or even at least the entirety of a length of the profile). The polymeric profiles may be formed from polymers including glass fibers. This material may be pelletized for use in pultrusion, thus reducing the length of the glass fibers to less than 5 mm, less than 3 mm, less than 2 mm or even less than 1 mm. The fibers may comprise strengthening materials which may include but are not limited to glass, Kevlar, carbon, thermoplastic fibers or combinations thereof. The material may include fibers having a length of at least about 5 mm. The material may include fibers having a length of at least about 10 mm. The material may include fibers having a length of at least about 20 mm. Such fibers may be formed into specific fiber arrangements such as ribbons, toes, strings, yarns, weaves or any combination of these to provide strengthening to the support structure. These fibers may extend along the entirety of the length of the support structure or may alternatively be located only locally at certain portions of the support structure. Furthermore, the fiber arrangements may be located along external portions of the beams, along internal portions of the beams or along both external and internal portions of the beams. The use of pultrusion mechanisms for forming the beams allows for the fiber arrangements to be easily selectively located at certain portions of the support structures. For example, the fibers can be provided to the pultruder at portions of the beams requiring localized reinforcement. Alternatively, the fiber arrangements can be continuously pultruded along the entirety of the support structure. As an example, the fibers may be Kevlar fibers formed into ribbons and the fibers may extend along only certain exterior portions of the beams. As yet another example, the fibers may be glass fibers formed into strings and the fibers may extend along the entirety of the beams. The pultrusion process itself may result in breaking of the fibers. As a result, the length of the fibers may be chosen to avoid breaking. The fibers may be formed into desired arrangements so that breaking is reduced. The fibers may also be located at specific locations along the beams so as to avoid breaking.

Additional fastening means and sleeves may be utilized to locate the telescoping beam devices within a support structure. Such fastening means may include a mechanical adhesive that is separate from or integrally formed with a portion of the beams. A sleeve may be a polymeric or metallic sleeve and may be formed to receive at least a portion of or substantially the entirety of a section of the outer beam. The fastening means may include an adhesive. In one embodiment, the fastening means may include a bracket which may be used in combination with one or more screws or other mechanical fasteners. Such brackets may also be utilized to connect the additional members to one another or to the telescoping beam device or a sleeve structure or the gear assembly. An adhesive may be utilized to bond the gear assembly to one or more of the outer beam and inner beam.

The manufacturing system may include one or more pultrusion steps, such as those described in PCT Publication No. WO2016/145161A1, published Sep. 15, 2016, incorporated by reference herein for all purposes. By way of example, a possible manufacturing system may be employed for a pultrusion operation instead of or in addition to an extrusion operation in accordance with the present teachings. Raw material for forming a base polymeric material body may be fed into a receptacle associated with a pultruder. The pultruder may have a die through which the raw material is passed to form a shaped body profile (e.g., a pultruded profile). A mass of fibers may be pulled through the die and infiltrated while in the die with the raw material. The raw material (which may be a one-component or a plural-component mixture of reactive ingredients) may have a relatively low viscosity sufficient to allow the raw material to impregnate the mass of fibers and thereafter harden in a desired shaped profile that includes the mass of fibers. The shaped body profile may be cooled (e.g., by a vacuum cooler) to a desired temperature. A feed system may feed a fibrous material (e.g., by way of rollers) to the die at which the raw material for forming the beams is contacted with the fibrous material (e.g., the mass of fibers). It is possible that a forming roller may also serve to help join the fibrous composite material with any optional shaped base body profile. The resulting overall composite may be cooled (e.g., by a cooling tank). Optionally, if to the resulting beam may be advanced by a conveyor device (e.g., a pulling or pushing device). An additional structure or material (e.g., an adhesive or one or more wear tabs or strips) may be applied to the beam by an extruder (e.g., a cross head extruder).

By way of illustration, without limitation, the raw material may be a glass filled polyurethane heated to a temperature of from about 160° C. to about 240° C. Upon exiting the cooler, the temperature may be about 150° C. to about 200° C. Upon exiting the cooling tank the composite may be at a temperature of about 120° C. At the time of passing the extruder, if present, the temperature may be about 90-95° C.

The teachings herein provide for a pultruded telescoping beam structure comprising a plurality of elongated tubular or solid beam structures, each having a first end and a second end. At least one attachment device or sleeve may be adapted for attaching the tubular structure to a larger support structure. The elongated beam structure may have a longitudinal axis and may also include a continuous fiber reinforcement embedded in a polymeric matrix and has a plurality of fibers aligned generally parallel with the longitudinal axis. A plurality of fibers (e.g., at least about 50%, 60%, 70% or more by weight of the total fiber content) may extend from the first end to the second end; by way of example the plurality of fibers may be generally aligned with the longitudinal axis. The plurality of fibers may be embedded in the polymeric material under a state of tension or compression.

The hollow beam may be open or closed along its length. The elongated beam structures may include one or more strips of material on an outer surface, the material adapted for facilitating movement of the inner beam into and out of the outer beam.

The continuous fibers may be preloaded into the polymeric material. The beam structure may have a constant profile along the longitudinal axis. From about 40% to about 80%, about 50% to about 70%, by weight of the beam may be fibers. The fibers may be glass fibers. The polymer of the polymeric matrix may be a polyurethane.

The teachings herein may apply to pultruding materials such as thermoset or thermoplastic materials. Examples of such materials may include polyesters, polyurethanes, epoxies, or otherwise. The die may be about 0.2 to about 1 (e.g., 0.5) meters in length. The rate of the pultruding is at least about 0.5 (1, 2 or 3) meters per minute. The die may include an opening therein into which the reactants are introduced so that the step of contacting occurs within the die. The contacting may occur in advance of the die (e.g., in a bath or pool).

The method may include a step of subjecting the resulting article to a secondary shaping operation, selected from thermoforming, blow molding, hydroforming, support structure injection molding, compression molding, cutting, heat shaping, joining (e.g., by adhesion, compression fitting or the like). The secondary operation may be performed continuously.

The resulting article may have an ultimate tensile strength (UTS) of at least 300 MPa to less than 1000 MPa. The resulting article may have a tensile modulus of at least 10 GPa to less than 50 GPa.

With reference to FIG. 1, there is seen a cross sectional view of an exemplary telescoping beam structure 10 as described herein. The beam structure 10 is shown including an outer beam 12 and an inner beam 14. In this particular example, the inner beam is shaped as an I-beam having curved end portions 15 at the terminating ends of the I-beam structure. The inner beam 14 also includes a plurality of wear tabs 16 along which the inner beam 14 slides during use. The inner beam is further shown including a gear track 18 that assists in facilitating movement of the inner beam 14 along the drive assembly 22. The inner beam 14/outer beam 12 assembly is integrated into the beam structure 10 by a molded sleeve 20 which is adapted to receive the inner beam/outer beam assembly.

Figure 2:
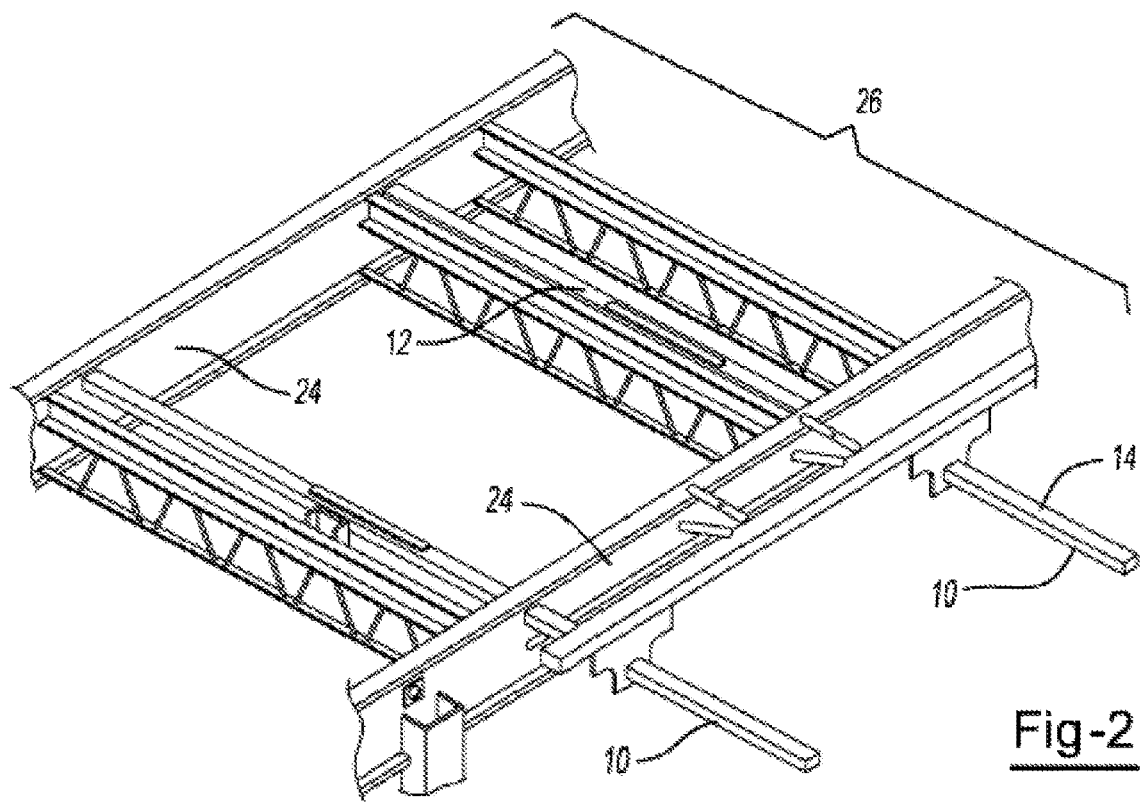
FIG. 2 illustrates a perspective view of an exemplary support structure in accordance with the present teachings.

As shown in FIG. 2, the telescoping beam structure 10 may be part of a larger support structure 26. As shown the larger support structure 26 includes two beam structures 10, each including an outer beam 12 and an inner beam 14. The support structure is shown having two parallel exterior support beams 24 which are arranged in a perpendicular direction with reference to each of the telescoping beam structures 10.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for ail purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A support structure for a housing comprising: one or more telescoping beam devices and at least two additional members disposed in a perpendicular arrangement, each said telescoping beam devices comprising:

an outer beam comprising a polyurethane material and a plurality of glass fibers that extend the entire length of the support structure;

an inner beam comprising a polyurethane material and a plurality of glass fibers that extend the entire length of the support structure in an I-beam shape and including curved end portions at terminating ends of the I-beam shape;

a plurality of wear tabs affixed to the inner beam;

a gear track affixed to the inner beam via a mechanical adhesive;

a molded sleeve at least partially surrounding the outer beam; wherein the outer beam is substantially hollow and adapted to receive the inner beam and the inner beam is shaped so that a portion of the inner beam extends nearly the entire height of the outer beam, and a portion of the inner beam extends nearly the entire width of the outer beam; and wherein the plurality of wear tabs are located at one or more corners of the inner beam and the gear track contacts a gear for facilitating movement of the inner beam and whereby a portion of the housing is adapted to move during use.

2. The support structure of claim 1, wherein the support structure is located as a support for a transportation vehicle.

3. The support structure of claim 1, wherein the inner beam is adapted to initially be located within the outer beam and then slide out of the outer beam.

4. The support structure of claim 3, wherein the inner beam supports a portion of a recreational vehicle, allowing the portion to extend from a first position outward to a second position as the inner beam slides out of the outer beam.

5. The support structure of claim 1, wherein the outer beam is substantially rectangular in shape having four walls.

6. The support structure of claim 1, wherein the I-beam includes two parallel wall structures and each wall structure includes at least one wear tab in between the wall structure and the outer beam.

7. The support structure of claim 1, wherein the I-beam includes two parallel wall structures and each wall structure includes at least two wear tabs in between the wall structure and the outer beam.

8. A support structure for a housing comprising: one or more telescoping beam devices and one or more additional members disposed in a perpendicular arrangement, each said telescoping beam devices comprising:

an outer beam comprising a polyurethane material and a plurality of glass fibers that extend the entire length of the support structure;

an inner beam comprising a polyurethane material and a plurality of glass fibers that extend the entire length of the support structure;

a plurality of wear tabs affixed to the inner beam;

a gear track affixed to the inner beam via a mechanical adhesive, the gear track assisting the movement of the inner beam along a drive assembly;

wherein the outer beam is substantially hollow and adapted to receive the inner beam and the inner beam is shaped so that a portion of the inner beam extends nearly the entire height of the outer beam, and a portion of the inner beam extends nearly the entire width of the outer beam; and wherein the plurality of wear tabs are located at one or more corners of the inner beam and the gear track contacts a gear for facilitating movement of the inner beam and whereby a portion of the housing is adapted to move during use and wherein the inner beam is formed as an I-beam, the I-beam includes two parallel wall structures and each wall structure includes at least one wear tab of the plurality of wear tabs in between the wall structure and the outer beam.

9. The support structure of claim 8, wherein the support structure is located as a support for a transportation vehicle.

10. The support structure of claim 8, wherein the inner beam is adapted to initially be located within the outer beam and then slide out of the outer beam.

11. The support structure of claim 10, wherein the inner beam supports a portion of a recreational vehicle, allowing the portion to extend from a first position outward to a second position as the inner beam slides out of the outer beam.

* * * * *